(12) United States Patent
Amacker et al.

(10) Patent No.: US 11,084,456 B2
(45) Date of Patent: Aug. 10, 2021

(54) RAMP STRUCTURES FOR A MOBILE PLATFORM

(71) Applicant: Toyota Research Institute, Inc., Los Altos, CA (US)

(72) Inventors: Matthew Amacker, Santa Clara, CA (US); Joseph Taylor, San Jose, CA (US); Gregory J. Klein, San Mateo, CA (US); Jonathan Yao, San Jose, CA (US); Andrew Custer, Oakland, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 149 days.

(21) Appl. No.: 16/565,587

(22) Filed: Sep. 10, 2019

(65) Prior Publication Data

US 2021/0070245 A1 Mar. 11, 2021

(51) Int. Cl.
*B60R 21/36* (2011.01)
*B62D 39/00* (2006.01)
*B60R 19/20* (2006.01)
*G01M 17/007* (2006.01)

(52) U.S. Cl.
CPC ............ *B60R 21/36* (2013.01); *B60R 19/205* (2013.01); *B62D 39/00* (2013.01); *G01M 17/0078* (2013.01)

(58) Field of Classification Search
CPC .. B60R 21/36; B60R 19/205; G01M 17/0078; B62D 39/00
See application file for complete search history.

(56) References Cited

U.S. PATENT DOCUMENTS

| | | | | |
|---|---|---|---|---|
| 4,782,909 A | * | 11/1988 | Kolodka | ................. B60R 19/00 180/271 |
| 7,033,119 B2 | * | 4/2006 | Baker | ....................... B60P 3/06 410/30 |
| 7,232,001 B2 | | 6/2007 | Hakki et al. | |
| 9,212,973 B2 | * | 12/2015 | Weber | ............... G01M 17/0078 |
| 2007/0164583 A1 | * | 7/2007 | Jong | ...................... B62D 39/00 296/187.03 |
| 2011/0025080 A1 | * | 2/2011 | Anand | ................... B60R 19/00 293/102 |
| 2013/0018526 A1 | | 1/2013 | Kelly et al. | |

FOREIGN PATENT DOCUMENTS

DE 19744817 A1 4/1999
DE 102005027432 A1 12/2005
JP 2000108824 A * 4/2000 ............. B60R 21/36

* cited by examiner

*Primary Examiner* — Drew J Brown
(74) *Attorney, Agent, or Firm* — Christopher G. Darrow; Darrow Mustafa PC

(57) ABSTRACT

A ramp structure for a mobile platform includes a housing structured to be mounted on the mobile platform, and a ramp member coupled to the housing so as to be movable with respect to the housing. At least one airbag is operably coupled to the housing and is configured to be inflatable to move the ramp member from a retracted position to an extended position in which the ramp member defines a ramp structured to guide a wheel of a subject vehicle onto an exterior surface of the housing.

16 Claims, 8 Drawing Sheets

RAMP STRUCTURES FOR A MOBILE PLATFORM

TECHNICAL FIELD

The subject matter described herein relates to systems and methods, including guided mobile platforms and guided soft targets, for testing crash avoidance technologies.

BACKGROUND

As Advanced Crash Avoidance Technologies (ACATs) such as Forward Collision Warning (FCW), Crash Imminent Braking Systems and other advanced technologies continue to be developed, the need for full-scale test methodologies that can minimize hazards to test personnel and damage to equipment has rapidly increased. A guided test platform may be utilized for testing vehicle technologies incorporated into a conventional passenger vehicle. The guided test platform may be structured to simulate aspects of a conventional vehicle so that a conventional passenger vehicle (or subject vehicle) may contact the guided test platform in a collision scenario. The guided test platform may be designed so that the subject vehicle may collide with and drive over the top of the guided test platform without damage to either the test platform or the subject vehicle. This enables the testing of various technologies incorporated into the subject vehicle with minimal vehicle damage and no injury to personnel.

SUMMARY OF THE INVENTION

In one aspect of the embodiments described herein, a ramp structure for a mobile platform is provided. The ramp structure includes a housing structured to be mounted on the mobile platform, and a ramp member coupled to the housing so as to be movable with respect to the housing. At least one airbag is operably coupled to the housing and is configured to be inflatable to move the ramp member from a retracted position to an extended position in which the ramp member defines a ramp structured to guide a wheel of a subject vehicle onto an exterior surface of the housing.

In another aspect of the embodiments described herein, a guided test platform is provided. The guided test platform includes a mobile platform and a ramp structure operably coupled to the mobile platform. The ramp structure includes a ramp member structured to be movable from a retracted position to an extended position. At least one airbag is operably coupled to the ramp member and is configured to be inflatable to move the ramp member from the retracted position to the extended position. One or more sensors are provided including sensors configured to detect position and motion parameters of a subject vehicle in an external environment of the guided test platform and sensors configured to detect position and motion parameters of the guided test platform. One or more processors are communicably coupled to the sensors. A memory is communicably coupled to the one or more processors and stores an autonomous control module including instructions that when executed by the one or more processors cause the one or more processors to (a) determine, using at least data from the sensors, if either one of the guided test platform and a subject vehicle is on a collision course with the other one of the guided test platform and the subject vehicle; (b) if one of the guided test platform and the subject vehicle is determined to be on a collision course with the other one of the guided test platform and the subject vehicle, estimate an amount of time until contact between the subject vehicle and the guided test platform; and (c) cause the at least one airbag to inflate so as move the ramp member from the retracted position to the extended position at least a predetermined amount of time prior to expiration of the estimated amount of time until contact between the subject vehicle and the guided test platform.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

Figure 1:
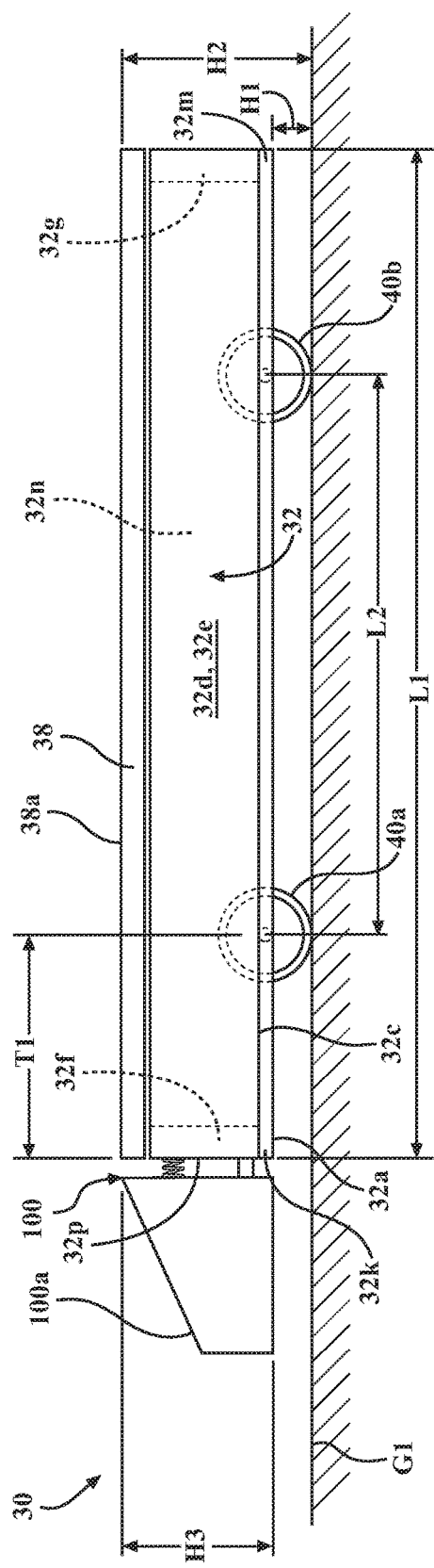
FIG. 1 is a schematic side view of a guided test platform showing a ramp structure in accordance with and embodiment described herein mounted to a side of a mobile platform.

In one or more arrangements described herein, a ramp structure for a mobile platform is provided. The ramp structure includes a housing structured to be mounted on the mobile platform and a ramp member coupled to the housing so as to be movable with respect to the housing. At least one airbag is operably coupled to the housing and configured to be inflatable to move the ramp member from a retracted position to an extended position in which the both the ramp member and a position of the housing combine to define a ramp structured to guide a wheel of a subject vehicle onto an exterior surface of the housing. The ramp structure may break away from the mobile platform to reside on a ground surface and be supported by the ground surface as the subject vehicle wheel rolls along the ramp structure and onto a top surface of the mobile platform.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements and/or features. In addition, similar reference numerals in different figures refer to elements common to the different figures. Also, numerous specific details are set forth in order to provide a thorough understanding of the embodiments described herein. However, it will be understood by those of ordinary skill in the art that the embodiments described herein can be practiced without these specific details.

FIG. 1 is a schematic side view of a guided test platform 30 in accordance with embodiments described herein. The guided test platform 30 may be structured to enable a subject vehicle (not shown), using a ramp structure as described herein, to drive onto a top surface of the test platform without damage to either the subject vehicle or the test platform. A "subject vehicle" may be a vehicle undergoing testing which involves operation of the subject vehicle in the environment of the guided test vehicle and which may involve collision or contact with the guided test vehicle. The subject vehicle may be a conventional motor vehicle (such as a passenger sedan, for example).

In embodiments described herein, the guided test platform 30 may include a mobile platform 32. Mobile platform 32 may include a base 32a. Base 32a may include a floor 32c. Opposed side walls 32d, 32e may extend from corresponding sides of floor 32c to form sides of the mobile platform 32. Walls 32d, 32e may be structured to enable attachment of ramp structures thereto, as described herein.

Opposed end walls 32f, 32g may extend from a front end 32k and a rear end 32m of base 32a to form front and rear walls of the mobile platform 32. In combination, walls 32d, 32e, 32f, and 32g may form an interior cavity 32n of the mobile platform 32. Interior cavity 32n may be structured for receiving therein various systems and components dedicated to propelling, stopping, guiding and otherwise operating the guided test platform 30 as the platform 30 moves along a ground or road surface G1. In one or more arrangements, walls 32d, 32e, 32f, and 32g may be structured to extend vertically from floor 32c when the base 32a is resting on a ground surface.

A cover 38 may be secured to edges of walls 32d, 32e, 32f, and 32g to enclose the interior cavity 32n and to provide a surface 38a along which a subject vehicle may be driven as described herein after contacting the guided test platform. Cover 38 is designed to enclose and protect the mobile platform systems and components contained in cavity 32n. Cover 38 may be attached to walls 32d, 32e, 32f, and 32g so as to be supported by the walls against a portion of the weight of a subject vehicle traveling along an outer or top surface 38a of the cover 38 when the guided test platform 30 resides on a ground or road surface, as shown in FIG. 1. When the guided test platform 30 is positioned on a ground or road surface G1, the cover top surface 38a may form a top surface of the mobile platform 32. Cover 38 may be structured and attached to walls 32d, 32e, 32f, and 32g so as to support at least a portion of the weight of a subject vehicle with little or no deflection of the cover, and so that the cover 38 deflects elastically (if at all) responsive to the applied portion of the subject vehicle weight. For test purposes, a structure (not shown) simulating a vehicle chassis may be mounted onto the top surface 38a of the cover 38 to create a "guided soft target" usable for testing subject vehicle sensors, warning systems, and occupant protection systems. This guided soft target may operate autonomously or under remote control so as to interact with subject vehicles in any of a variety of test scenarios.

The mobile platform 32 may be suspended above the ground surface 36 by a plurality of wheels 40a, 40b. The wheels 40a, 40b may be mounted to the base 32a via wheel mountings (not shown) located inside the interior cavity 32n. The wheels 40a, 40b may extend through the base 32a to the base exterior via openings formed in the base 32a. The wheels 40a, 40b may include driven wheels and non-driven wheels. In one or more arrangements, all of the wheels 40a, 40b may be driven wheels. In other arrangements, some of the wheels may be driven wheels and other wheels may be non-driven wheels. The driven wheels may be operably coupled to (or be part of) a mobile platform propulsion system 82 (FIG. 3) configured to drive the driven wheels to propel the guided test platform 30 along the ground surface 36. At least a portion of the mobile platform wheels 40a, 40b may be structured to be steerable by a mobile platform steering system 86 (FIG. 3), to guide the mobile platform 32 along the ground surface. The embodiment shown in FIG. 1 includes driven wheels 40b and non-driven, steerable wheels 40a.

In one or more arrangements, the mobile platform wheels 40a, 40b may be mounted to the mobile platform base 32a so as to retract into the base floor openings responsive to application of a portion of the weight of a subject vehicle exerted on the mobile platform cover 38 when the subject vehicle rides along the cover 38. This may aid in preventing damage to the wheels 40a, 40b and other elements of the propulsion system due to loading by the subject vehicle. For example, the wheels 40a, 40b and associated wheel mountings may be structured to retract or recess into the floor openings (and, optionally, into the interior cavity 32n) responsive to application of a force on the wheel mountings exceeding a certain predetermined threshold. For example, in one or more arrangements, the predetermined threshold force may be set high enough so that the wheels 40a, 40b and wheel mountings retract into the floor openings only when at least one wheel of the subject vehicle resides on the top surface of the mobile platform. In one or more arrangements, the predetermined threshold force may be set low enough so that one or more of the wheels 40*a*, 40*b* and associated wheel mountings retract into the floor openings when the threshold force is due to a subject vehicle wheel riding up a ramp embodiment as described herein, in a direction toward the top surface 38*a* of the cover 38. In this embodiment, retraction of one or more of the wheels 40*a*, 40*b* may occur prior to a subject vehicle wheel contacting the cover top surface 38*a*.

Figure 3:
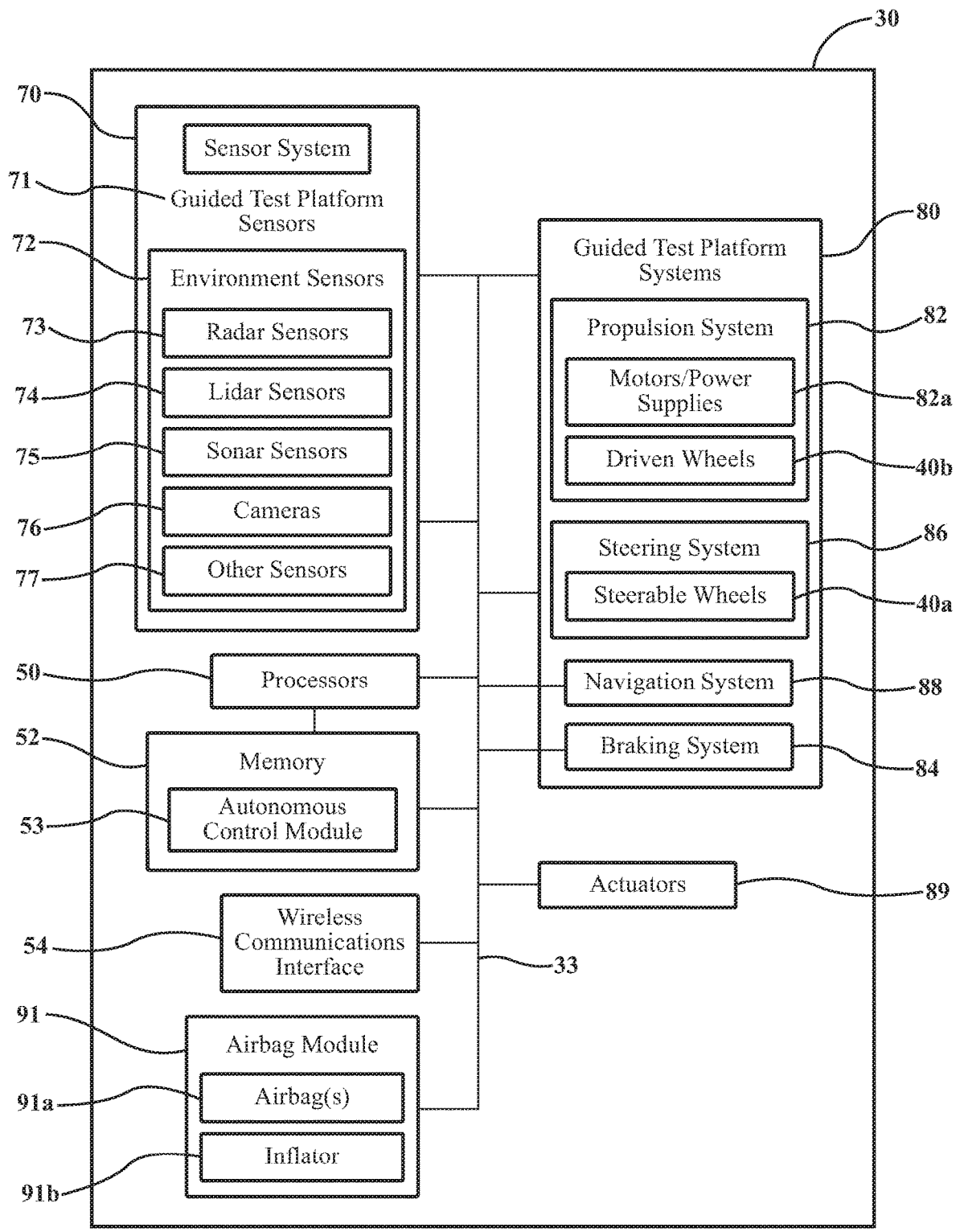
FIG. 3 is a block schematic diagram of the guided test platform of FIG. 1 showing elements and systems configured to enable functioning of the guided test platform as described herein.

FIG. 3 is a schematic block diagram showing various elements and systems for controlling operations of the guided test platform 30. The guided test platform 30 can have any combination of the various elements shown in FIG. 3. The guided test platform 30 may have more or fewer elements and/or systems than shown. The platform 30 may also include alternative elements and/or systems to those shown. In some arrangements, the guided test platform 30 may be implemented without one or more of the elements shown in FIG. 3.

The guided test platform 30 can include one or more processors 50. In one or more arrangements, the processor(s) 50 can be a main processor of the guided test platform 30. For instance, the processor(s) 50 can be an electronic control unit (ECU). The processor(s) 50 may be operably connected to other elements of the guided test platform for receiving information from the other elements and for issuing control commands to the other elements, to control or aid in controlling operations of the guided platform. The term "operably connected," as used throughout this description, can include direct or indirect connections, including connections without direct physical contact.

One or more memories 52 may be operably coupled to the processor(s) 50 for storing an autonomous control module 53 (described below), other modules, and any data and other information needed for diagnostics, operation, control, etc. of the guided test platform. The memories 52 may be one or more of a random-access memory (RAM), read-only memory (ROM), a hard-disk drive, a flash memory, or other suitable memory for storing the required modules and information.

Some or all operations of the guided test platform 30 may be autonomously controlled, for example, by one or more autonomous control module(s) 53. As used herein, "autonomous control" refers to controlling various aspects of the movement and/or other operations of the guided test platform 30 with minimal or no input from a human operator. In one or more embodiments, the guided test platform 30 is highly automated or completely automated. Generally, "module", as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium, such as memory 52. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In addition to the autonomous control module 53, one or more other modules (not shown) for other purposes may be incorporated into the guided test platform 30. Any of the modules can be implemented as computer-readable program code that, when executed by processor(s) 50, autonomously implement various guided test platform control functions. Such functions may include control of the various guided test platform systems described herein. One or more of the modules can be a component of the processor(s) 50, or one or more of the modules can be executed on and/or distributed among other processing systems to which the processor(s) 50 is operably connected. The modules can include instructions (e.g., program logic) executable by the one or more processor(s) 50.

In one or more arrangements, one or more of the guided test platform modules can include artificial or computational intelligence elements, e.g., neural network, fuzzy logic or other machine learning algorithms. Further, in one or more arrangements, the functions of one or more of the modules can be distributed among a plurality of the modules described herein. In one or more arrangements, two or more of the modules can be combined into a single module.

The autonomous control module 53 and/or processor(s) 50 can be configured to receive data from the sensor system 70 and/or any other type of system or element capable of acquiring information relating to the guided test platform 30 and/or the external environment of the guided test platform 30. In one or more arrangements, the autonomous control module 53 and/or processor(s) 50 can use such data in controlling the guided test platform. The autonomous control module 53 can determine position and velocity of the guided test platform 30. The autonomous control module 53 can be configured to receive and/or determine location information for neighboring vehicles and other environmental features. Information acquired by the autonomous control module 53 may be used to determine the current state of the guided test platform 30 and/or to estimate position and orientation of the guided test platform 30 with respect to its environment. The autonomous control module 53 can control various operations of the guided test platform 30 either alone or in combination with processor(s) 50.

The autonomous control module 53 can be configured to determine travel path(s), current autonomous maneuvers for the guided test platform 30, future autonomous maneuvers and/or modifications to current autonomous maneuvers based on data acquired by the sensor system 70 and/or data from any other suitable source. "Autonomous maneuver" means one or more actions that affect the movement of the guided test platform 30. Examples of autonomous maneuvers include accelerating, decelerating, braking, turning, and/or reversing, just to name a few possibilities. The autonomous control module 53 can be configured to implement determined autonomous maneuvers. The autonomous control module 53 can cause, directly or indirectly, such autonomous maneuvers to be implemented. As used herein, "cause" or "causing" means to make, command, instruct, and/or enable an event or action to occur or at least be in a state where such event or action may occur, either in a direct or indirect manner. The autonomous control module 53 can be configured to execute various vehicle control functions and/or to transmit data to, receive data from, interact with, and/or control the guided test platform 30 and/or one or more systems thereof (e.g. one or more of guided test platform systems 80).

In one or more arrangements, some or all operations of the guided test platform 30 may be controlled remotely, for example, by radio control from a remote station (not shown). To enable wireless control of the platform 30, the platform may be provided with a wireless communications interface 54. In one or more embodiments, the guided test platform 30 is configured with one or more semi-autonomous operational modes in which one or more computing systems perform a portion of the navigation and/or maneuvering of the guided test platform, and a human operator provides inputs to the guided test platform to perform a portion of the navigation and/or maneuvering of the guided test platform 30.

As noted above, the guided test platform 30 can include the sensor system 70. The sensor system 70 can include one or more sensors. "Sensor" means any device, component and/or system that can detect, and/or sense something. The one or more sensors can be configured to detect, and/or sense in real-time. As used herein, the term "real-time" means a level of processing responsiveness that system senses as sufficiently immediate for a particular process or determination to be made, or that enables the processor to keep up with some external process.

In arrangements in which the sensor system 70 includes a plurality of sensors, the sensors can function independently from each other. Alternatively, two or more of the sensors can work in combination with each other. In such a case, the two or more sensors can form a sensor network. The sensor system 70 and/or the one or more sensors can be operably connected to the processor(s) 50, control module 53 and/or another element of the guided test platform 30 (including any of the elements shown in FIG. 3).

The sensor system 70 can include any suitable type of sensor. Various examples of different types of sensors are described herein. However, it will be understood that the embodiments are not limited to the particular sensors described. The example sensors may include one or more environment sensors 72 and/or one or more guided test platform sensors 71. However, it will be understood that the embodiments are not limited to the particular sensors described.

The guided test platform sensor(s) 71 can detect, determine, and/or sense information about the guided test platform 30 itself. In one or more arrangements, the guided test platform sensor(s) 71 can be configured to detect, and/or sense position and orientation changes of the guided test platform 30, such as, for example, based on inertial acceleration. The guided test platform sensor(s) 71 may include one or more sensors configured to detect position and motion parameters of the guided test platform 30. In one or more arrangements, the guided test platform sensor(s) 71 can include one or more accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, the guided test platform sensor(s) 71 can include a speedometer to determine a current speed of the guided test platform 30.

Environment sensors 72 may be configured to acquire, and/or sense guided test platform environment data. "Guided test platform environment data" includes data and/or information about the external environment in which the guided test platform is located. For example, the one or more environment sensors 72 can be configured to detect, quantify and/or sense vehicles and/or obstacles in at least a portion of the external environment of the guided test platform 30 and/or information/data about such vehicle and/or obstacles. Such obstacles may be stationary objects and/or dynamic objects. Sensor system 70 may include one or more sensors configured to detect position and motion parameters of a subject vehicle in an external environment of the guided test platform 30.

The one or more environment sensors 72 can be configured to detect, measure, quantify and/or sense other things in the external environment of the guided test platform 30, such as, for example, vehicles, lane markers, signs, traffic lights, traffic signs, lane lines, crosswalks, curbs proximate the guided test platform 30, off-road objects, etc. As an example, in one or more arrangements, the sensor system 70 can include one or more radar sensors 73, one or more LIDAR sensors 74, one or more sonar sensors 75, and/or one or more cameras 76. In addition, other types of sensors 77 may be incorporated into the sensor system 70 for various purposes, depending on the specific test requirements and operational requirements of the guided test platform 30.

The guided test platform 30 can include one or more guided test platform systems 80. Various examples of the one or more guided test platform systems 80 are shown in FIG. 3. However, the guided test platform 30 can include more, fewer, or different guided test platform systems. In addition, the systems shown may contain more, fewer, or different elements than those shown in FIG. 3. It should be appreciated that although particular guided test platform systems are separately defined, each or any of the systems or portions thereof may be otherwise combined or segregated via hardware and/or software within the guided test platform 30. The guided test platform 30 can include a propulsion system 82, a braking system 84, a steering system 86, and/or a navigation system 88. Each of these systems can include one or more devices, components, and/or combination thereof, now known or later developed.

The propulsion system 82 may include any motors, batteries, and/or other power supplies (collectively designated 82*a*) which may be coupled to the driven wheels 40*b* via a suitable drive train (not shown). The drive train may include chain drives, belt drives, gears, and/or any other suitable mechanisms for transferring motion from platform power sources 82*a* to the platform driven wheels 40*b*. Platform throttle or acceleration control elements may be incorporated into the propulsion system. For example, power supplied from platform batteries to a guided test platform drive train may be regulated to control the speeds of the driven wheels. The steering system 86 may include steerable wheels 40*a* and any system, mechanisms and/or actuators suitable for implementing steering commands from the autonomous control module 53 and/or processor(s) to steer the guided test platform 30. The braking system 84 may include any systems, elements and/or mechanisms suitable for implementing braking commands from the autonomous control module 53 to control braking of any of wheels 40*a*, 40*b*. The navigation system 88 can include one or more devices, sensors, applications, and/or combinations thereof, now known or later developed, configured to determine the geographic location of the guided test platform 30 and/or to determine a travel route for the guided test platform 30. The navigation system 88 can include one or more mapping applications to determine a travel route for the guided test platform 30. The navigation system 88 can include a global positioning system, a local positioning system or a geolocation system.

Guided test platform 30 may incorporate one or more airbag(s) 91*a* for purposes described herein. An inflator 91*b* may be operably coupled to the airbag for inflating the airbag responsive to an airbag activation command. Airbag(s) 91*a* and inflator 91*b* may be operably coupled to any of the other elements and/or systems of the guided test module as required for operation of the airbag as described herein. In one or more arrangements, the airbag(s) 91*a* and inflator 91*b* may be incorporated into an airbag module 91 operably coupled to one or more other elements (for example, to autonomous control module 53) of the guided test platform 30 for controlling the airbag module 91. Airbag module 91 may be used for actuating various embodiments of a ramp structure as described herein.

The guided test platform 30 can include one or more actuators 89. The actuators 89 can be any element or combination of elements operable to modify, adjust and/or alter one or more of the guided test platform systems 80 or components thereof to responsive to receiving signals or other inputs from the processor(s) 50 and/or the autonomous control module 53. Any suitable actuator can be used. For instance, the one or more actuators 89 can include motors, pneumatic actuators, hydraulic pistons, relays, solenoids, and/or piezoelectric actuators, just to name a few possibilities.

Referring again to FIGS. 1 and 2, the guided test platform 30 may also include one or more ramp structures, generally designated 100 in FIGS. 1 and 2 for purposes of description. As used herein, the term "ramp structure" refers to a structure which ascends or extends generally upwardly with respect to the ground surface G1 toward an uppermost or top surface 38a of the mobile platform 32. The ramp structure may be structured to support the weight of a portion of a vehicle (as transmitted to the ramp structure though a rotating subject vehicle wheel or tire) and to guide a subject vehicle wheel from a ground or road surface G1 upwardly toward the uppermost or top surface 38a of the mobile platform cover, along which the subject vehicle wheel may ride as it runs over the mobile platform 32.

Figure 2:
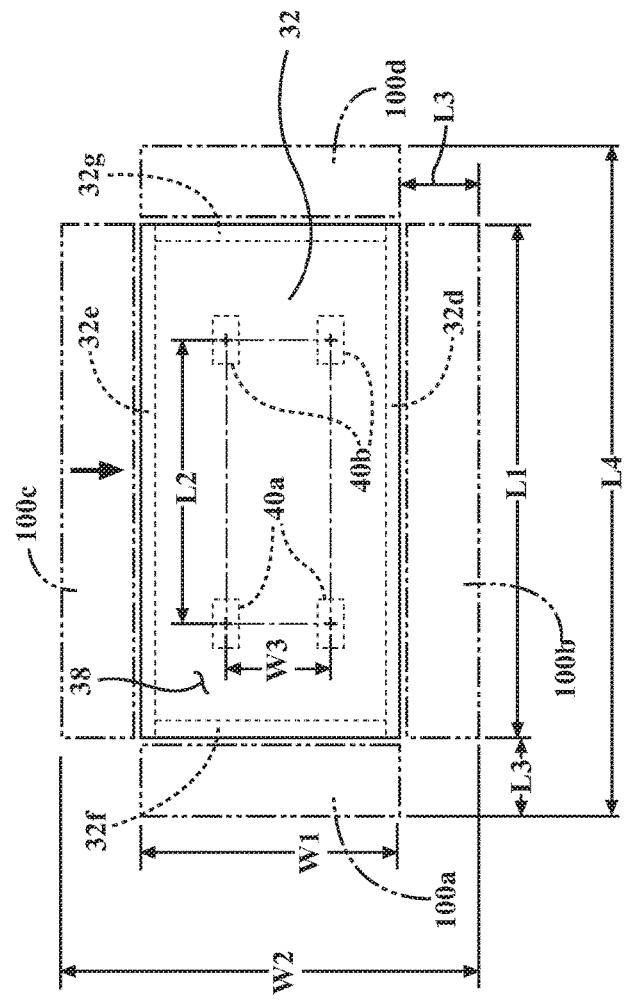
FIG. 2 is a schematic plan view of the guided test platform of FIG. 1 showing how ramp structures in accordance with embodiments described herein may be attached to sides of a mobile platform.

Ramp structures 100 may be structured for attachment to the sides of the mobile platform 32. FIG. 1 shows schematically the attachment of a ramp structure 100a to a front end 32p of the mobile platform. FIG. 2 is a plan view of the guided test platform shown in FIG. 1 showing how ramp structure 100a and various additional ramp structures 100b, 100c, 100d may be attached to the sides of the mobile platform 32. FIGS. 1 and 2 also show various exemplary overall dimensions of the guided test platform 30 after attachment of the ramp structures thereto. Although different embodiments of the ramp structures are described herein, any embodiment of a ramp structure may be structured for attachment to any side of the mobile platform 32, and any side of the mobile platform may be structured for attachment of any embodiment of a ramp structure thereto. In addition, different embodiments of the ramp structure may be attached to associated different sides of the mobile platform 32, depending on the requirements of particular test scenarios. Although common characteristics of the ramp structures will be described with reference to the bumper embodiment shown in FIG. 1, it will be understood that all of the ramp structure embodiments may have certain similar overall characteristics.

Generally, embodiments of a ramp structure described herein may include a housing structured to be mounted on the mobile platform, and a ramp member coupled to the housing so as to be movable with respect to the housing. At least one airbag may be operably coupled to the housing and configured to be inflatable to move the ramp member from a retracted position to an extended position. In the extended position of the ramp member, the ramp member defines a ramp structured to guide a wheel of a subject vehicle onto the exterior surface of the housing. From the exterior surface of the housing, the vehicle wheel may then proceed onto the top surface of the mobile platform cover 38.

The ramp structures may be coupled to the mobile platform 32 using any method suitable for purposes described herein. The ramp structures may be attached to the mobile platform 32 so as to maintain the ramp structures suspended at least a predetermined distance H1 (FIG. 1) above the ground surface G1 during motion of the guided test platform 30 along the ground surface G1. The predetermined distance H1 may be at least equal to the clearance between the mobile platform 32 and the ground surface G1 provided by wheels 40a, 40b. For example, a ramp structure housing may have threaded inserts secured in a portion thereof structured for mounting to an associated mobile platform wall, and suitable bolts or studs may be used to attach the ramp structure to the mobile platform wall using the threaded inserts. Other mounting mechanisms may be used instead of (or in addition to) bolts or studs.

Figure 4A:
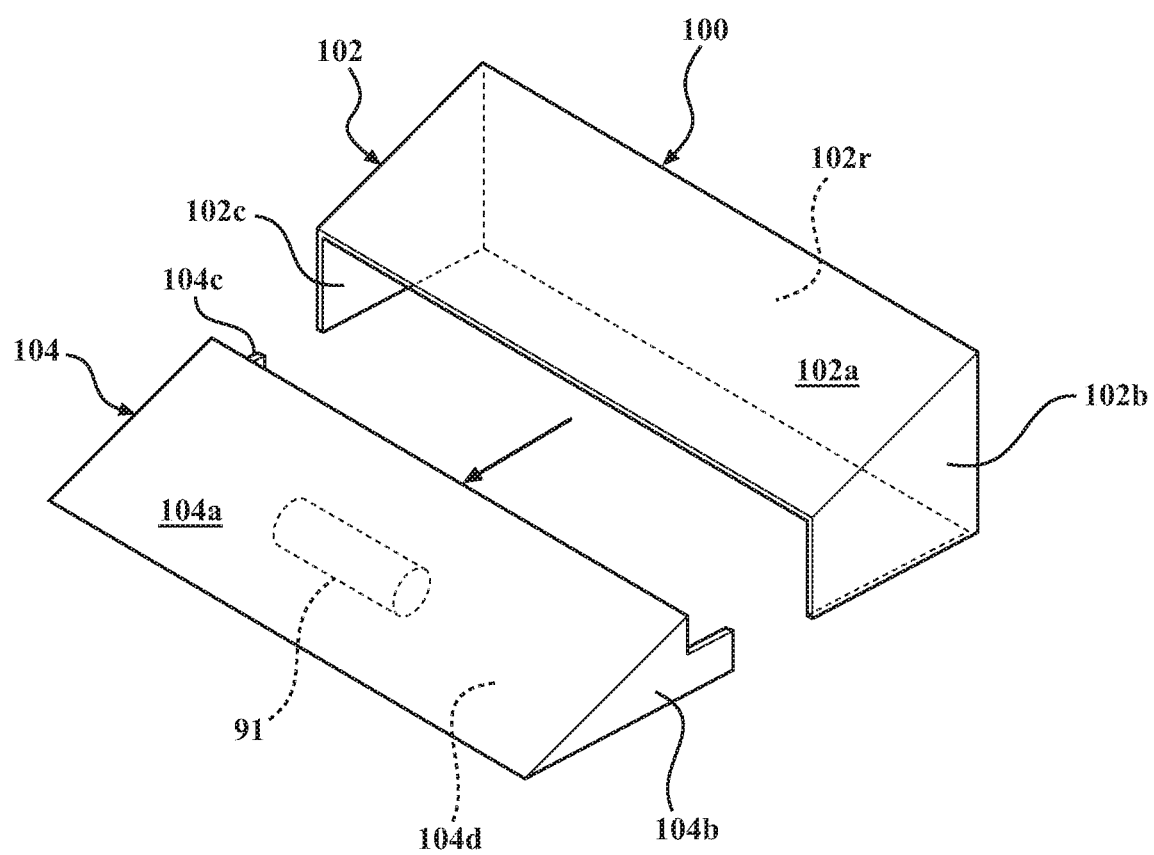
FIG. 4A is a schematic exploded perspective view of a ramp structure in accordance with an embodiment described herein.

FIG. 4A is an exploded perspective view of a ramp member 104 and an associated housing 102 of a ramp structure 100 in accordance with one particular embodiment described herein. FIGS. 4B-4F are schematic side cross-sectional views showing the structure and operation of the ramp structure shown in FIG. 4A.

Referring to FIGS. 4A-4F, housing 102 may include a first wall 102a, a second wall 102b extending from the first wall 102a and a third wall 102c extending from the first wall 102a opposite the second wall 102b. The first, second, and third walls 102a-102c may be structured to support a portion of a weight of the subject vehicle as transmitted through at least one subject vehicle wheel (not shown) moving along the first wall 102a, when the ramp structure 100 is positioned on a ground surface.

In addition, as seen in FIGS. 4A-4D, the housing first wall 102a may be structured to form an acute angle A1 with the ground surface G1 when the housing is mounted on the mobile platform 32 and the mobile platform is positioned on the ground surface G1 so as to be rollable along the ground surface G1. This angled surface of the housing first wall 102a forms a portion of a ramp leading from the ground surface to a top surface 38a of the guided test platform 30. Housing 102 may have any material thicknesses and/or structural features (such as ribs) which will enable the housing 102 to support the weight of a portion of the subject vehicle during movement of the subject vehicle wheel along the housing first wall 102a. Housing 102 may be formed from any material or materials (for example, metallic materials) suitable for the purposes described herein.

In the embodiment shown in FIGS. 4A-4F, the ramp member 104 includes a first wall 104a, a second wall 104b extending from the first wall 104a and a third wall 104c extending from the first wall 104a opposite the second wall 104b. In addition, the first, second, and third walls 104a-104c are also structured to support a portion of the weight of the subject vehicle as transmitted through at least one subject vehicle wheel (not shown) moving along the first wall 104a, when the ramp structure 100 is positioned on the ground surface G1.

Ramp member 104 may have any material thicknesses and/or structural features (such as ribs) which will enable the ramp member 104 to support the weight of a portion of the subject vehicle during movement of the subject vehicle wheel along the ramp member first surface 104a. Ramp member 104 may be formed from any material or materials (for example, metallic materials) suitable for the purposes described herein. Also, the ramp member first wall 104a may be structured to form an acute angle A2 with the ground surface G1 when the ramp structure is mounted on the mobile platform 32 and the mobile platform 32 is positioned on the ground surface G1 so as to be rollable along the ground surface G1. In one or more arrangements, the angles A1 and A2 may have the same value. In addition, the ramp member walls 104a-104c may combine to define a cavity 104*d* therein. An airbag 91*a* may be secured within cavity 104*d* and secured to the ramp member 104. For example, airbag 91*a* may be incorporated into an airbag module 91 including inflator 91*b* operably connected to airbag 91*a* and configured for inflating the airbag 91*a* responsive to a control signal. The airbag module 91 may be secured to one or more of ramp member walls 104*a*-104*c*. The airbag module 91 may include other elements (not shown) if required for functioning of the airbag as described herein. Inflator 91*b* and/or airbag module 91 may be operably coupled to one or more other guided test platform systems via a system bus 33 as shown in FIG. 3. The airbag may also be shaped or tethered to focus its expansion in a particular direction (for example, direction D1 of FIG. 4C) during inflation.

Referring to FIGS. 4B-4F, in one or more arrangements, shear pins or break-away fasteners 121 may be used to mount the ramp structure 100 to the mobile platform 32. The break-away fasteners 121 may be structured to break responsive to the application of at least a threshold force. The threshold force may be applied by excessive rotation of the ramp structure 100 during initial contact of the subject vehicle wheel(s) 201 with the ramp member 100, or the threshold force may be applied by the subject vehicle wheel(s) 201 moving along the ramp member 104 after rotation of the ramp structure 100. This may help ensure that the guided test platform 30 is not tipped or flipped over by the weight of the subject vehicle as it contacts and/or moves along the ramp structure 100. In addition, one or more spring members 123 may be sued to mount the ramp structure 100 to the mobile platform 32. The spring members 123 may connect the ramp structure housing 102 to the mobile platform 32. The spring members 123 may operate to keep the ramp structure 100 attached to the mobile platform 32 after the break-away bolts or fasteners 121 have ruptured. In addition, the spring members 123 may permit the ramp member 104 to be forced into contact with ground surface G1 after the break-away bolts or fasteners 121 have broken. This enables the ramp structure 100 to be supported by the road surface G1 as one or more subject vehicle wheel(s) 201 move along the ramp structure.

In embodiments described herein, the autonomous control module 53 may include instructions that when executed by the processor(s) 50 cause the processor(s) to determine, using at least data from the sensors 70, if either one of the guided test platform 30 and a subject vehicle is on a collision course with the other one of the guided test platform 30 and the subject vehicle. For example, the autonomous control module 53 or other locations in memory 52 may include instructions that when executed by the processor(s) 50 cause the processor(s)s to determine if one or both of the guided test platform 30 and the subject vehicle are moving, and the direction(s) and speed(s) of movement. The autonomous control module 53 may also include instructions that when executed by the processor(s) 50 cause the processor(s) to, if one of the guided test platform 30 and the subject vehicle is determined to be on a collision course with the other one of the guided test platform 30 and the subject vehicle, estimate an amount of time until contact between the subject vehicle and the guided test platform 30. The autonomous control module 53 may also include instructions that when executed by the processor(s) 50 cause the processor(s) to cause the airbag(s) 91*a* to inflate so as move the ramp member 104 from the retracted position to the extended position at least a predetermined amount of time prior to expiration of the estimated amount of time until contact between the subject vehicle and the guided test platform 30. For example, the airbag inflator 91*b* may be configured to be operable to inflate the airbag(s) 91*a* responsive to a control signal generated by the processor(s) 50. In one or more arrangements, the airbag inflator 91*b* may be operable to inflate the airbag(s) 91*a* responsive to a wireless control signal. This helps ensure extension of the ramp member 104 prior to contact with the subject vehicle wheel(s) 201.

Operation of the ramp structure embodiment 100 shown in FIGS. 4A-4F will now be discussed.

Figure 4B:
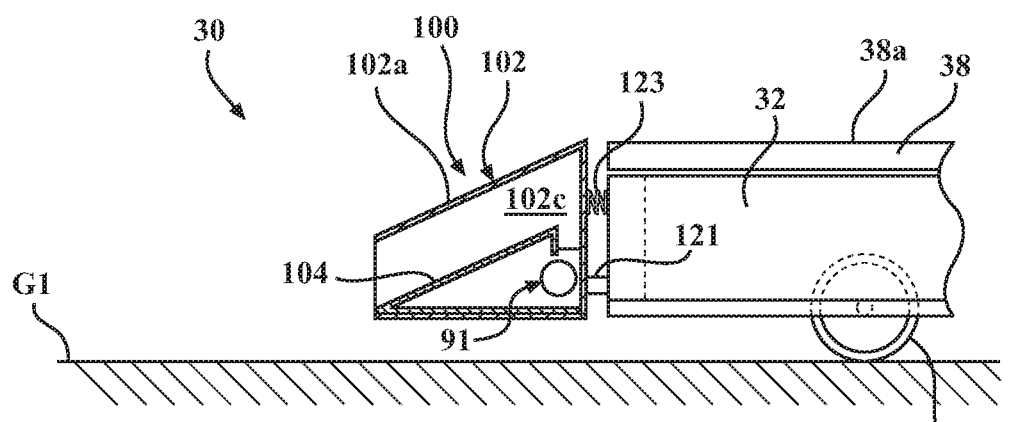
FIG. 4B is a schematic side cross-sectional view of a portion of a guided test platform including a ramp structure as shown in FIG. 4A mounted thereon, and showing a ramp member of the ramp structure in a retracted position.

FIG. 4B shows the ramp structure 100 prior to receipt of a control signal and activation of the airbag module 91 to extend the ramp member 104. Airbag(s) 91*a* may be operably coupled to the ramp member 104 and may be configured to be inflatable to move the ramp member 104 from the retracted position to the extended position. As stated previously, sensor system 70 may include sensors configured to detect position and motion parameters of a subject vehicle (not shown) in an external environment of the guided test platform 30. Sensor system 70 may also include sensors configured to detect position and motion parameters of the guided test platform 30.

Figure 4C:
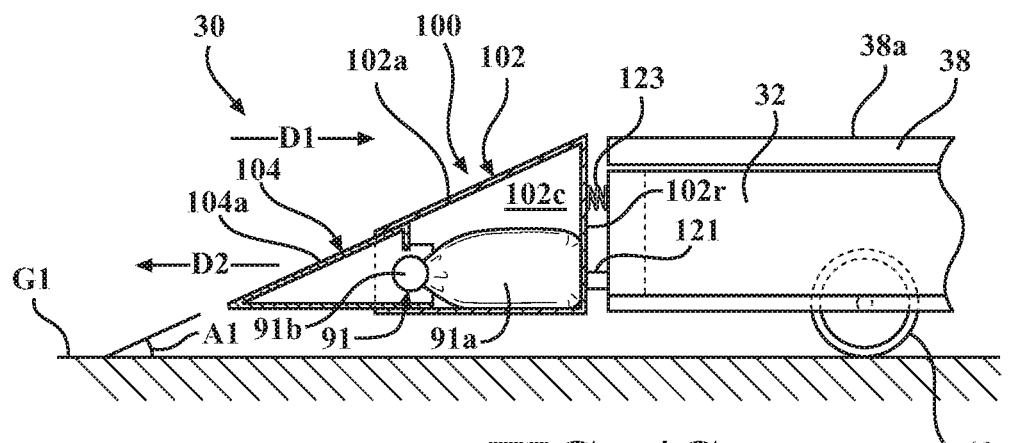
FIG. 4C is the schematic side cross-sectional view FIG. 4B showing the ramp member in an extended position.
Figure 4D:
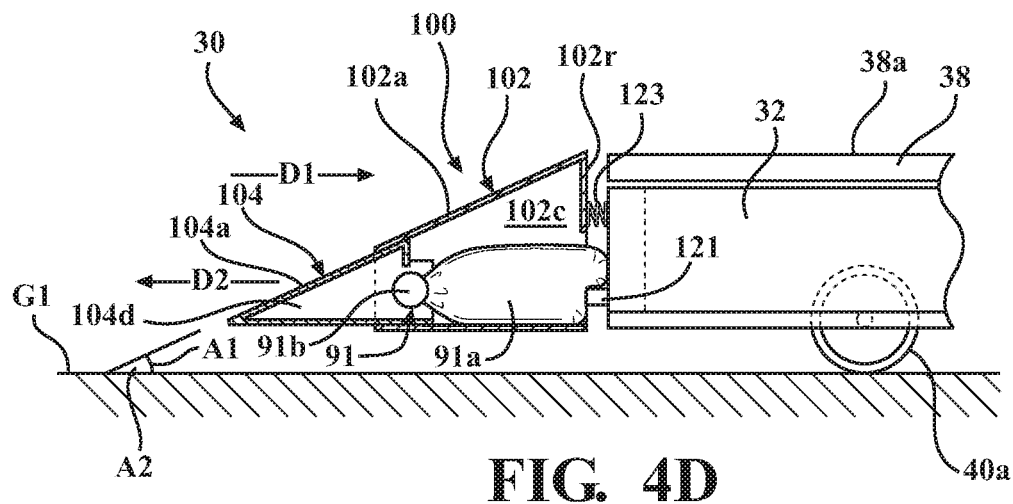
FIG. 4D is a schematic side cross-sectional view of a ramp structure in accordance with an alternative embodiment similar to the embodiment shown in FIGS. 4A-4C, showing a ramp member in an extended position.

Referring to FIG. 4C, responsive to a control signal, the airbag(s) 91*a* may inflate in a first direction D1 to contact a reaction surface. Contact of the airbag(s) 91*a* with the reaction surface produces a reaction force urging the ramp member 104 in a second direction D2 opposite the first direction D1 to move the ramp member 104 from the retracted position to the extended position. In one or more arrangements, as shown in FIGS. 4A and 4C, the reaction surface may be formed by a portion of the housing 102, such as a rear wall 102*r*. In other arrangements, as shown in FIG. 4D, the reaction surface may be formed by a portion (such as a side wall) of a mobile platform 32 to which the ramp structure 100 is attached when the ramp structure 100 is attached to the mobile platform 32.

During movement of the ramp member 104 in direction D2, a portion of the ramp member 104 may come into contact with a portion of housing 102 to halt further motion of the ramp member 104 in direction D2. For example, as seen in FIG. 4C, ramp member first wall 104*a* may come into contact with housing first wall 102*a*, thereby preventing further motion of ramp member 104 in direction D2. This configuration may define an extended condition of the ramp member 104. Alternatively, other surfaces or features of the ramp member 104 and/or the housing 102 may be structured to come into contact to restrict further motion of the ramp member 104.

Figure 4E:
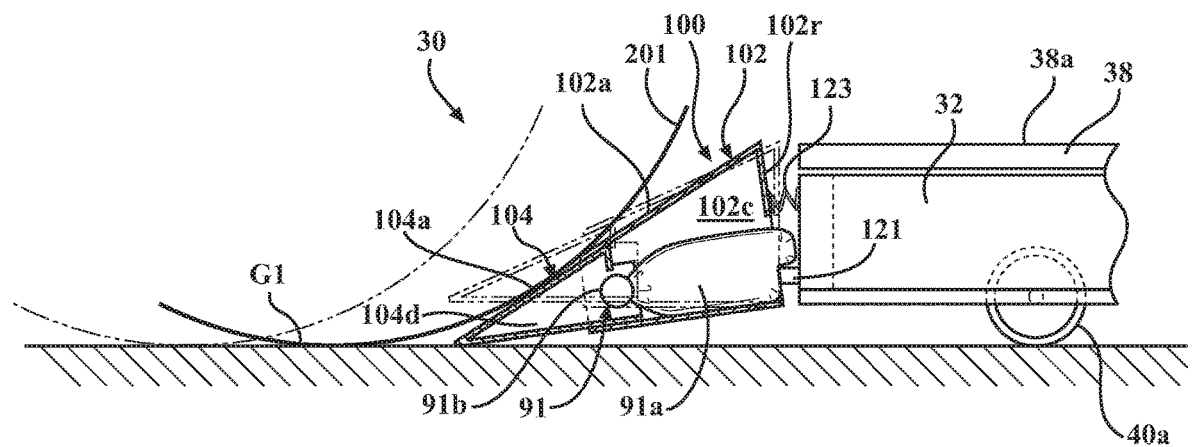
FIG. 4E is the view of FIG. 4C showing a movement of the ramp structure responsive to initial contact of a subject vehicle wheel with the ramp structure.
Figure 4F:
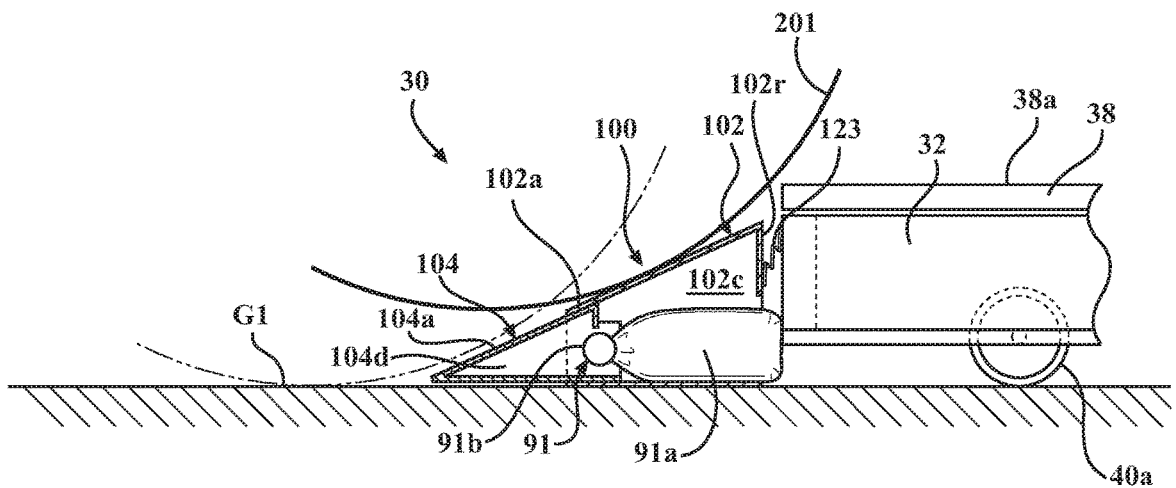
FIG. 4F is the view of FIG. 4E showing a final position of the ramp structure on a ground surface as the subject vehicle wheel moves along the ramp member and an exterior surface of the ramp structure housing toward a top surface of the guided test platform.

FIG. 4C shows the ramp member 104 moved to the extended position by inflation of the airbag(s) 91*a*, and prior to contact of the ramp structure by a subject vehicle wheel(s) 201. The ramp is then formed by the combination of ramp first wall 104*a* and housing first wall 102*a*. Referring to FIGS. 4E and 4F, as a subject vehicle wheel(s) 201 contacts the extended ramp member 104, the wheel forces the ramp member to rotate toward ground surface G1. This may cause the ramp member 104 to contact the ground surface G1. Rotation of the ramp structure 100 or subsequent movement of the subject vehicle wheel(s) 201 may cause the fasteners 121 to break, allowing the ramp structure 100 to be forced into contact with the ground surface G1. The subject vehicle wheel(s) 201 may then proceed up the ramp structure 100 as the spring members 123 maintain the ramp structure in proximity to the mobile platform 32. Thus, in the embodiment shown in FIGS. 4A-4F, the weight of the portion of the subject vehicle moving along the ramp is supported by the ramp structure housing 102 and ramp member 104, and not by the airbag 91*a*.

Figure 5A:
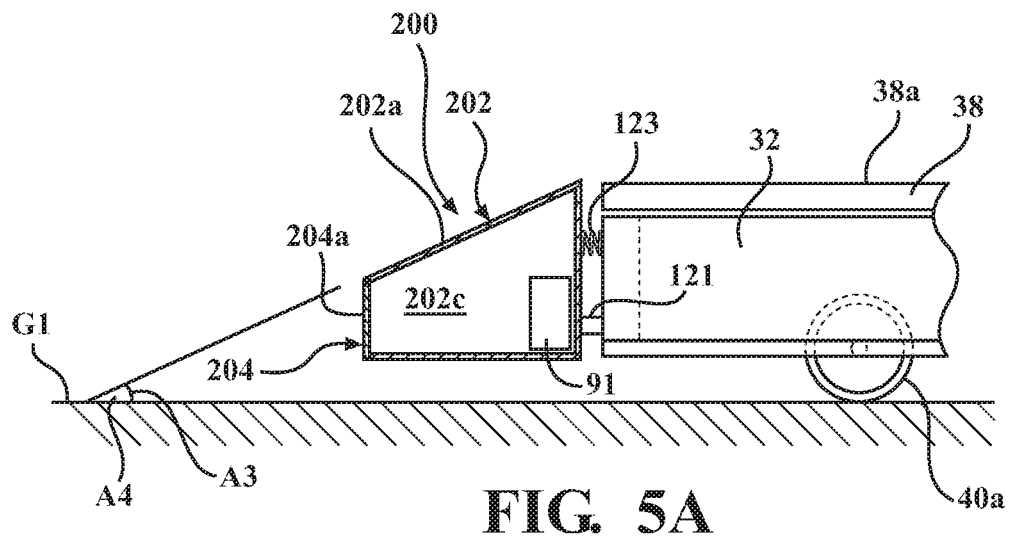
FIG. 5A is a side cross-sectional view of a portion of a guided test platform including a ramp structure in accordance with another embodiment described herein, and showing a ramp member of the ramp structure in a retracted position.
Figure 5B:
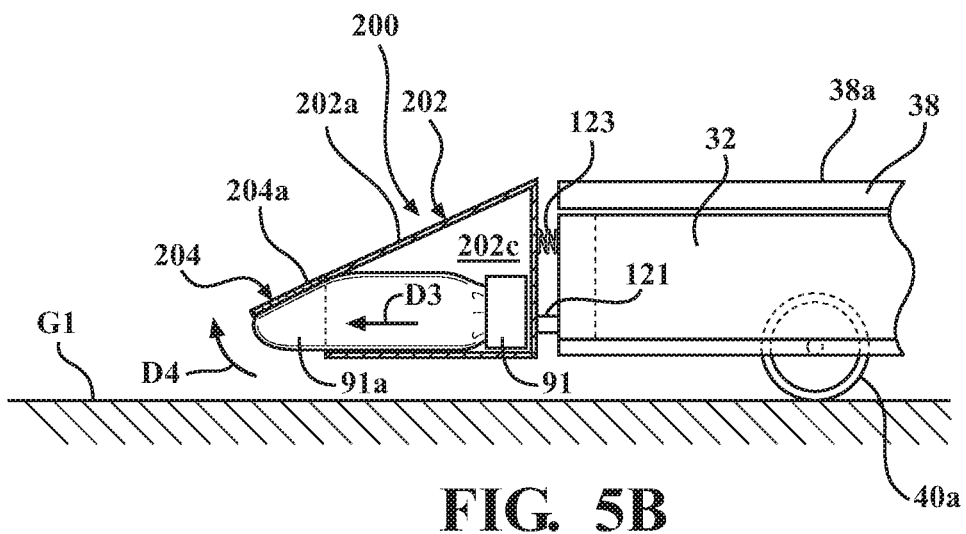
FIG. 5B is the schematic side cross-sectional view FIG. 5A showing the ramp member in an extended position.

FIGS. 5A-5D show the structure the structure and operation of another embodiment 200 of the ramp structure. In the embodiment shown, the ramp member 204 is coupled to the housing 202 so as to be rotatable from the retracted position to the extended position. The airbag(s) 91a is configured to be inflatable to rotate the ramp member 204 from the retracted position (FIG. 5A) to the extended position (FIG. 5B). The airbag module 91 may be positioned within the ramp member housing 202.

Referring to FIGS. 5A-5D, housing 202 may be structured similarly to housing 102 previously described, and may include a first wall 202a, a second wall 202b extending from the first wall 202a and a third wall 202c extending from the first wall 202a opposite the second wall 202b. The first, second, and third walls 202a-202c may be structured to support a portion of a weight of the subject vehicle as transmitted through at least one subject vehicle wheel (not shown) moving along the first wall 202a, when the ramp structure 200 is positioned on a ground surface. In addition, as previously described, the housing first wall 202a may be structured to form an acute angle A3 with the ground surface G1 when the housing 202 is mounted on the mobile platform 32 and the mobile platform is positioned on the ground surface G1 so as to be rollable along the ground surface G1. This angled surface of the housing first wall 202a forms a portion of a ramp leading from the ground surface G1 to a top surface 38a of the mobile platform 32.

Housing 202 may have any material thicknesses and/or structural features (such as ribs) which will enable the housing 202 to support the weight of a portion of the subject vehicle during movement of the subject vehicle wheel along the housing first surface 202a. Housing 202 may be formed from any material or materials (for example, metallic materials) suitable for the purposes described herein.

In the embodiment shown in FIGS. 5A-5D, the ramp member 204 may be a flat plate rotatably connected to the housing 202. Rotation of the ramp member 204 in direction D4 may be restricted by a suitable mechanical hard stop (not shown). Rotation of the ramp member 204 may be restricted so as to provide (at full rotation) an acute angle A4 with respect to the ground surface G1 when the ramp member 204 is mounted on the mobile platform 32 and the mobile platform is positioned on the ground surface G1 so as to be rollable along the ground surface G1. In one or more arrangements, the angle A4 may be equal to the angle A3. Ramp member 204 may have any material thicknesses and/or structural features (such as ribs) which will enable the ramp member 204 to support the weight of a portion of the subject vehicle during movement of the subject vehicle wheel along the ramp member surface 204a. Ramp member 204 may be formed from any material or materials (for example, metallic materials) suitable for the purposes described herein. Ramp structure 200 may be mounted to the mobile platform 32 in the same manner as described previously for the embodiment shown in FIGS. 4B-4F.

Movement of the ramp member 204 shown in FIGS. 5A-5D may be initiated in the same manner as described previously, using a control signal. Prior to contact of the subject vehicle wheel(s) 201 with the ramp structure 200, the airbag 91a may be inflated in direction D3 to rotate the ramp member in direction D4. The ramp is then formed by the combination of ramp member 204 and housing first surface 202a.

Figure 5C:
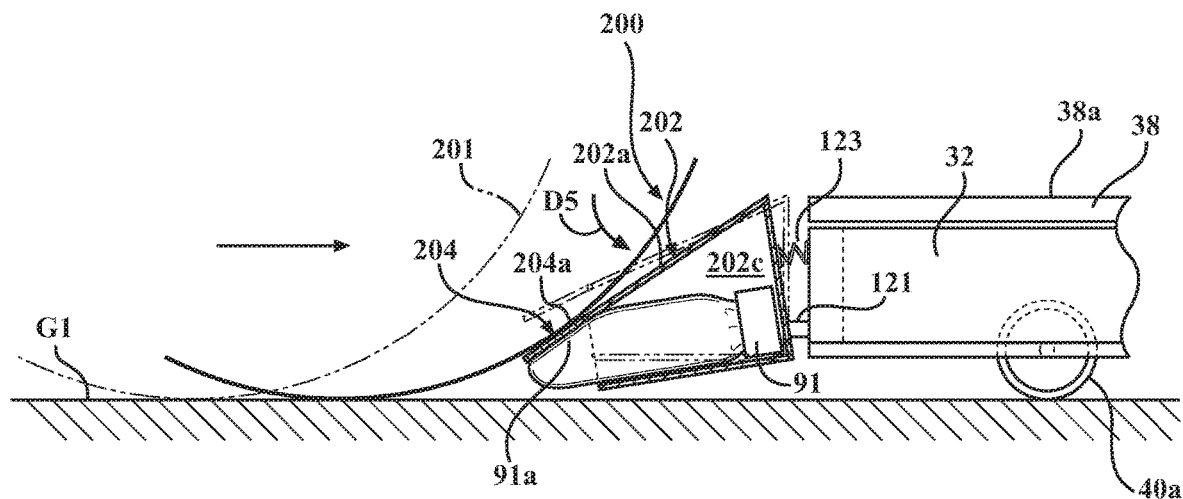
FIG. 5C is the view of FIG. 5B showing a movement of the ramp structure responsive to initial contact of a subject vehicle wheel with the ramp structure.
Figure 5D:
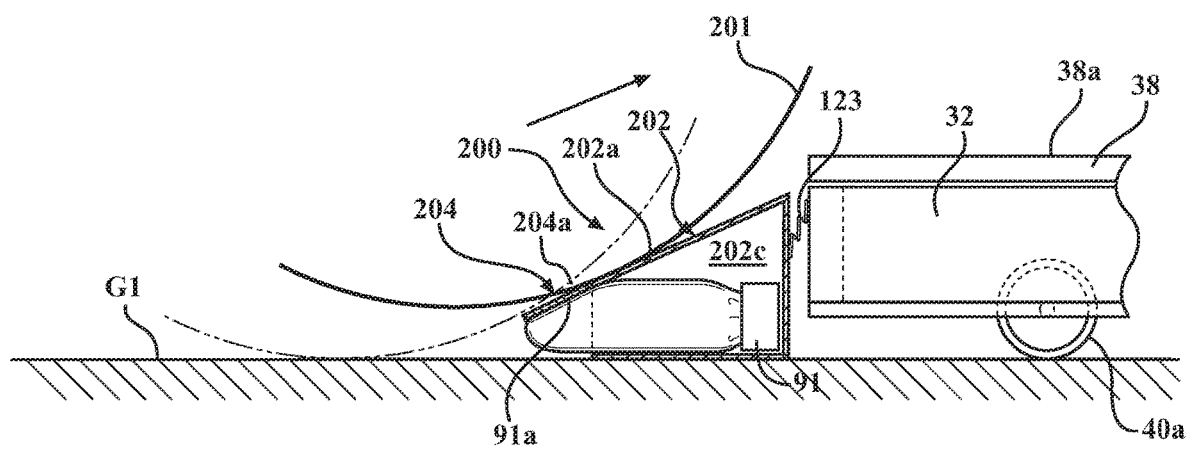
FIG. 5D is the view of FIG. 5C showing a final position of the ramp structure on a ground surface as the subject vehicle wheel moves along the ramp member and an exterior surface of the ramp structure housing toward a top surface of the guided test platform.

Referring to FIGS. 5C and 5D, as a subject vehicle wheel(s) 201 contacts the extended ramp member 204, the wheel forces the ramp member 204 to rotate in direction D5, toward the ground surface G1. This may cause the ramp member 104 to contact the ground surface G1. Rotation of the ramp structure 200 or subsequent movement of the subject vehicle wheel(s) 201 may cause the fasteners 121 to break, allowing the ramp structure 200 to be forced down to the ground surface G1. The subject vehicle wheel(s) 201 may then proceed up the ramp structure 200 as the spring members 123 maintain the ramp structure 200 in proximity to the mobile platform 32. As seen in FIGS. 5C and 5D, airbag 91a may be structured to aid in supporting the weight of the portion of the subject vehicle moving along the ramp.

Extension of an embodiment of a ramp member described herein to form a ramp may enable a subject vehicle wheel to ride up the ramp, onto the top surface 38a of the mobile platform, and off of the top surface back onto the ground surface G1 without damaging the mobile platform 32 or its contents.

Figure 6:
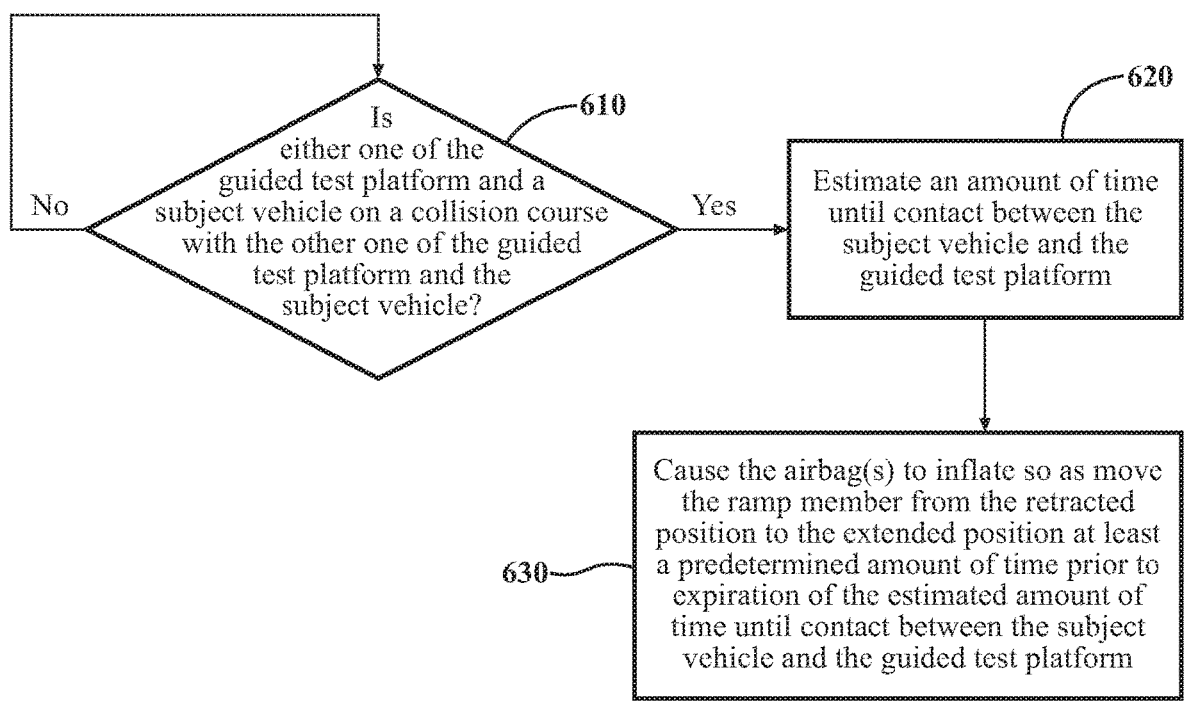
FIG. 6 is a flow diagram illustrating autonomous operation of a ramp structure in accordance with embodiments described herein.

FIG. 6 is a flow diagram illustrating detection of pending contact between the guided test platform 30 and a test vehicle. The guided test platform sensors may continuously scan an environment of the guided test platform, to detect vehicles and/or obstacles. In block 610, the autonomous control module 53 may determine, using at least data from the sensors 70, if either one of the guided test platform 30 and a subject vehicle is on a collision course with the other one of the guided test platform 30 and the subject vehicle. If one of the guided test platform 30 and the subject vehicle is determined not to be on a collision course with the other one of the guided test platform 30 and the subject vehicle, the sensors 70 may continue scanning. If one of the guided test platform 30 and the subject vehicle is determined not to be on a collision course with the other one of the guided test platform 30 and the subject vehicle, the autonomous control module 53 may (in block 620) estimate an amount of time until contact between the subject vehicle and the guided test platform 30. The autonomous control module 53 may the (in block 630) cause the airbag(s) 91a to inflate so as move the ramp member 104 from the retracted position to the extended position at least a predetermined amount of time prior to expiration of the estimated amount of time until contact between the subject vehicle and the guided test platform 30.

Referring again to FIGS. 1 and 2, the various dimensions of the mobile platform 32 and the ramp structure embodiments 100-200 described herein may be specified so as to aid in preventing the guided test platform 30 from tilting upwardly and striking an undercarriage of the subject vehicle responsive to pressure by the subject vehicle wheels and also to facilitate movement of the subject vehicle wheel(s) up the various ramp structures and onto the cover top surface 38a. The exemplary dimensions described herein are for cases where the ramp members of any ramp structures attached to the mobile platform 32 are in extended conditions. For example, referring to FIGS. 1 and 2, the dimension L1 (i.e., a total length of the mobile platform 32 without any ramp structures mounted thereto) may be specified so as to be about 80 inches plus or minus 3 inches. The dimension L2 (a distance between rotational axes of the steerable wheels 40a and the driven wheels 40b) may be specified so as to be about 71 inches plus or minus 3 inches. The dimension L3 (a length of an exemplary ramp structure) may be specified so as to be about 17 inches plus or minus 3 inches. The dimension L4 (i.e., a total length of the guided test platform including ramp structures with a ramp structure mounted to each end of the mobile platform 32 may be specified so as to be greater than or equal to the wheelbase of a typical subject vehicle (i.e., the distance from the centerline of the front axle to the centerline of the rear axle of the subject vehicle). In particular embodiments, the dimension L4 may be selected to be about 116 inches plus or minus 3 inches.

The dimension H1 (a ground clearance of the mobile platform 32 and ramp structures with ramp structures mounted on the mobile platform 32) may be specified so as to be about 0.75 inches plus or minus 0.1 inches. The dimension H2 (a distance of the mobile platform top surface 38a to the ground surface G1) may be specified so as to be about 4.1 inches plus or minus 0.3 inches. The dimension H3 (an overall height or thickness of a space envelope occupied by an exemplary ramp structure) may be specified so as to be about 3.7 inches plus or minus 0.3 inches. The dimension T1 (a distance from a front end 32p of the mobile platform 32 to the rotational axis of the steerable wheels 40a) may be specified so as to be about 5.5 inches plus or minus 2 inches. The dimension W1 (i.e., a total width of the mobile platform 32 without any ramp structures mounted thereto) may be specified so as to be about 30 inches plus or minus 3 inches. The dimension W2 (an overall width of the guided test platform 30 with ramp structures mounted along each side of the mobile platform 32) may be specified so as to be about 66 inches plus or minus 3 inches. The dimension W3 (a distance between adjacent steerable wheels 40a and between adjacent driven wheels 40b) may be specified so as to be about 24 inches plus or minus 3 inches. Thus, when all of the ramp structures in FIG. 2 are attached to the mobile platform as shown, an overall width dimension of the guided test platform 30 may be equal to W2, and an overall length dimension of the platform 30 may be equal to L4.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods and/or operations described herein is suited. A typical combination of hardware and software can be a processing system with computer-usable program code that, when being loaded and executed, controls the processing system such that it carries out the methods and/or operations described herein. The systems, components and/or processes also can be embedded in a computer-readable storage, such as a computer program product or other data programs storage device, readable by a machine, tangibly embodying a program of instructions executable by the machine to perform methods and/or operations described herein. These elements also can be embedded in an application product which comprises all the features enabling the implementation of the methods described herein and, which when loaded in a processing system, is able to carry out these methods.

Furthermore, arrangements and/or operations described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A ramp structure for a mobile platform, the ramp structure comprising:
   a housing structured to be mounted on the mobile platform;
   a ramp member coupled to the housing so as to be movable with respect to the housing; and
   at least one airbag operably coupled to the housing and configured to be inflatable to move the ramp member from a retracted position to an extended position in which the ramp member defines a portion of a ramp structured to guide a wheel of a subject vehicle onto an exterior surface of the housing.

2. A guided test platform comprising:
a mobile platform; and
a ramp structure in accordance with claim 1 attached to the mobile platform.

3. The ramp structure of claim 1 wherein the housing has a first wall, a second wall extending from the first wall and a third wall extending from the first wall opposite the second wall, wherein the first, second, and third walls are structured to support a portion of a weight of the subject vehicle as transmitted through at least one subject vehicle wheel moving along the first wall, when the ramp structure is positioned on a ground surface.

4. The ramp structure of claim 3 wherein the housing first wall is structured to form an acute angle with the ground surface when the housing is mounted on the mobile platform and the mobile platform is positioned on the ground surface so as to be rollable along the ground surface.

5. The ramp structure of claim 1 wherein the ramp member is coupled to the housing so as to be rotatable from the retracted position to the extended position, and wherein the at least one airbag is configured to be inflatable to rotate the ramp member from the retracted position to the extended position.

6. The ramp structure of claim 5 wherein the at least one airbag is positioned within the ramp member.

7. The ramp structure of claim 1 wherein the ramp member defines a cavity therein and the at least one airbag is positioned within the cavity and secured to the ramp member, the at least one airbag being configured to inflate in a first direction to contact a reaction surface, and wherein contact of the airbag with the reaction surface produces a reaction force urging the ramp member in a second direction opposite the first direction to move the ramp member from the retracted position to the extended position.

8. The ramp structure of claim 7 structured such that the reaction surface is formed by a mobile platform to which the ramp structure is attached when the ramp structure is attached to the mobile platform.

9. The ramp structure of claim 7 structured such that the reaction surface is formed by a portion of the housing.

10. The ramp structure of claim 7 wherein the ramp member is structured to contact the housing during movement of the ramp member from the retracted position to the extended position, to prevent further movement of the ramp member in the second direction.

11. The ramp structure of claim 10 wherein the ramp member has a first wall, a second wall extending from the first wall and a third wall extending from the first wall opposite the second wall, wherein the first, second, and third walls are structured to support a portion of a weight of the subject vehicle as transmitted through at least one subject vehicle wheel moving along the first wall, when the ramp structure is positioned on a ground surface.

12. The ramp structure of claim 11 wherein the ramp member first wall is structured to form an acute angle with the ground surface when the ramp member is mounted on the mobile platform and the mobile platform is positioned on the ground surface so as to be rollable along the ground surface.

13. A guided test platform comprising:
a mobile platform;
a ramp structure operably coupled to the mobile platform, the ramp structure including a ramp member structured to be movable from a retracted position to an extended position;
at least one airbag operably coupled to the ramp member and configured to be inflatable to move the ramp member from the retracted position to the extended position;
one or more sensors;
one or more processors communicably coupled to the one or more sensors; and
a memory communicably coupled to the one or more processors and storing an autonomous control module including instructions that when executed by the one or more processors cause the one or more processors to:
determine, using at least data from the one or more sensors, if either one of the guided test platform and a subject vehicle is on a collision course with the other one of the guided test platform and the subject vehicle;
if one of the guided test platform and the subject vehicle is determined to be on a collision course with the other one of the guided test platform and the subject vehicle, estimate an amount of time until contact between the subject vehicle and the guided test platform; and
cause the at least one airbag to inflate so as move the ramp member from the retracted position to the extended position at least a predetermined amount of time prior to expiration of an estimated amount of time until contact between the subject vehicle and the guided test platform.

14. The guided test platform of claim 13 further comprising an airbag inflator operably coupled to the airbag for inflating the airbag, the airbag inflator being configured to be operable to inflate the airbag responsive to a control signal generated by the one or more processors.

15. The guided test platform of claim 13 wherein the airbag inflator is configured to be operable to inflate the airbag responsive to a wireless control signal.

16. The guided test platform of claim 13 wherein the ramp structure is coupled to the mobile platform so as to be partially detachable from the mobile platform to be forced into contact with a ground surface responsive to contact of a subject vehicle wheel with the ramp structure.

* * * * *